Patented Oct. 6, 1953

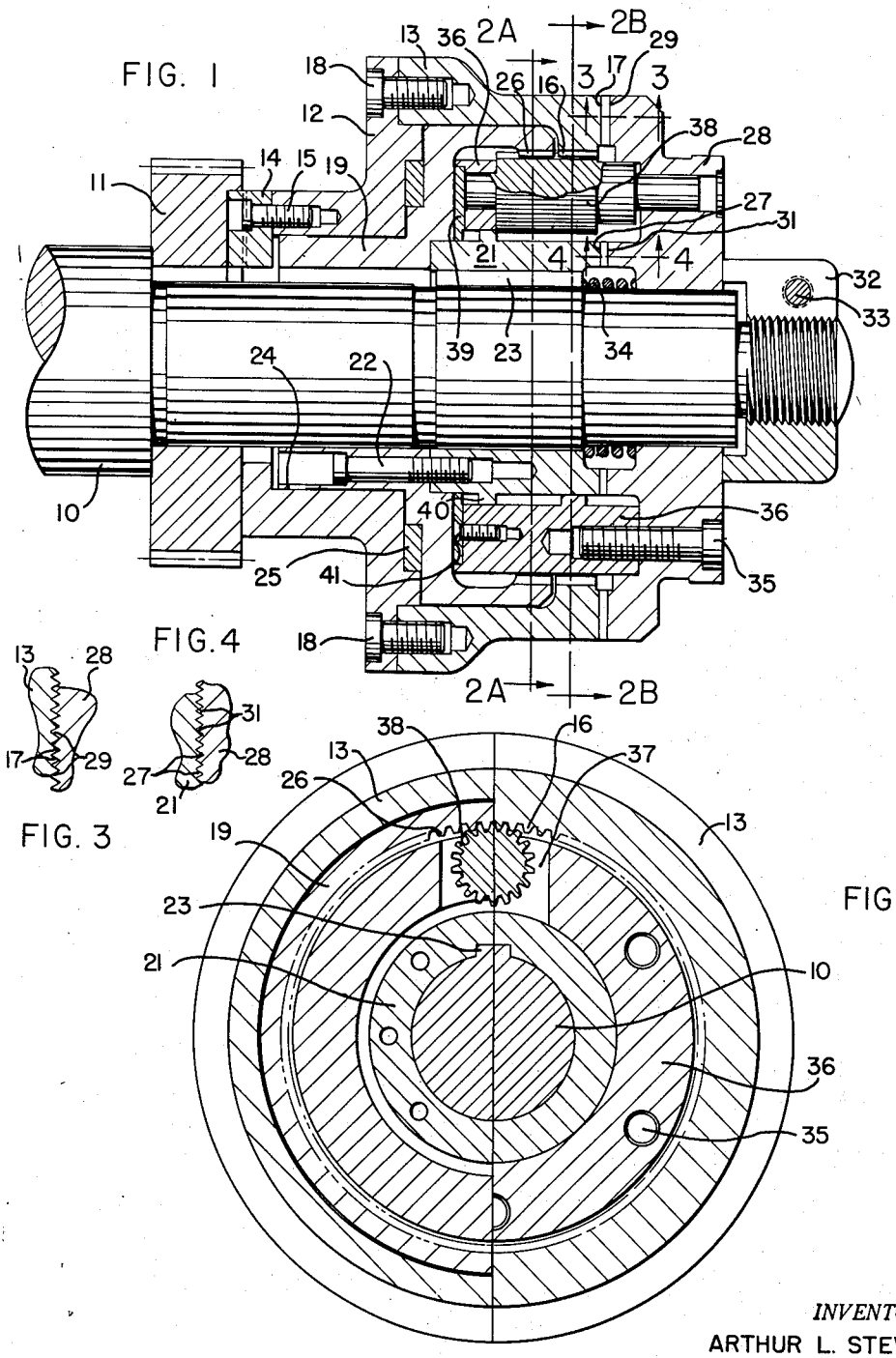

2,654,262

UNITED STATES PATENT OFFICE 2,654,262

FINE ADJUSTMENT DEVICE

Arthur L. Stewart, Brighton, N. Y., assignor to The Gleason Works, Rochester, N. Y., a corporation of New York Application November 23, 1951, Serial No. 257,875

14 Claims. (Cl. 74—395)

The present invention relates to a device for making fine adjustments, the device being particularly but not exclusively adapted for making such adjustments of angularly adjustable parts of a rotatable assembly.

For example in gear grinding machines of the kind disclosed in Patent No. 2,566,402 of W. C. Critchley and H. A. Male, such an adjustment is desirable in the drive train for the work spindle, to the end that the gear being ground may be adjusted about its axis through small increments to provide fine control of the amount of stock removed from its teeth. This amount may be on the order of a fraction of a thousandth of an inch, and therefore requires an angular adjustment of exceedingly small magnitude, especially when grinding gears of large diameter.

Various devices have been employed heretofore for this purpose, one such device comprising a worm wheel fixed on one part of a rotatable assembly and a housing fixed on another part of the assembly, the housing containing a worm meshing with the worm wheel. Relative angular adjustment of the parts was effected by rotating the worm, and after such adjustment the worm was secured to the housing by suitable clamping or locking means. One disadvantage was that drive loads were transmitted through the worm gearing so that any backlash in this gearing resulted in play between the drive and driven parts. Furthermore, the worm and its housing and the clamping or locking means for the worm represented a substantial mass disposed eccentrically from the common axis of rotation of the drive and driven parts. This was particularly disadvantageous in instances where these parts rotated at high speeds.

In the adjusting means of the present invention, the parts to be relatively adjusted are for convenience hereinafter sometimes termed the drive and driven parts, although, as will be apparent, one of them may if desired be a stationary part. The drive and driven parts have clutch teeth which interengage with clutch teeth on a locking part. During adjustment the mating clutch teeth are separated, but upon completion of the adjustment they are clamped together in interengaged relation so that the drive and driven and locking parts thereafter act as a solid unit, entirely without backlash or play. The two mating pairs of clutch teeth, one pair of which is on the drive part and locking part while the other pair on the driven part and the locking part, are of slightly different tooth number so that very fine increments of adjustment are possible.

In order to engage the clutch teeth of the locking part with those of both the drive and driven parts it is necessary that the three parts be in a particular positional relationship. The present invention provides aligning means which automatically and positively maintain the parts in such relationship so that when one pair of clutch teeth is interengageable the other pair also will be. This aligning means comprises a pinion rotatably mounted on the locking part and gear teeth on the drive and driven parts meshing with the pinion. The pinion and gear teeth are so arranged, and are of such tooth number or pitch relationship, that by turning the locking part relative to one other part, say the drive part, by an amount such that their clutch teeth will interengage, the remaining part, in this case the driven part, will thereby be moved by an amount such that the clutch teeth of the locking and driven parts also will interengage.

As applied to a rotatable assembly, the described arrangement of the pinion and gears enables a balanced design, without substantial eccentricity of mass. Preferably the gears are of the internal type which permits a compact and balanced arrangement while at the same time enabling the tooth numbers of the gears to be large enough to provide the desired fineness of adjustment.

The foregoing and other objects and advantages of the invention will appear from the following detailed description made with reference to the drawings, wherein:

Fig. 1 is an axial section through the device;

Fig. 2 is a transverse sectional view whose left half is taken along section line 2A—2A of Fig. 1 and whose right half is taken along section line 2B—2B of Fig. 1; and, Figs. 3 and 4 are fragmentary plane developments of cylindrical sections taken as indicated respectively by section lines 3—3 and 4—4 in Fig. 1.

The device shown in the drawings is designed to provide for angular adjustment between a rotatable shaft 10 and a gear 11 that is rotatably mounted on the shaft. Either the shaft or the gear may constitute the drive member, and the other the driven member, but for convenience it will be considered throughout the following description that gear 11 is the driver. The device comprises a part rotatable in coaxial relationship with the shaft, this part being made in two sections, designated 12 and 13, to facilitate manufacture. It is considered to be the drive part of the device inasmuch as it is rotatable with the gear 11, being connected thereto by a key 14 held in place by a screw 15. On section 13 are formed internal gear teeth 16 and face clutch teeth 17. Sections 12 and 13 are joined by screws 18.

The driven part of the device is, for convenience, also made up of two sections, designated 19 and 21. These are connected to each other by screws 22 and to shaft 10 by a key 23 formed integrally with the latter. A bearing surface 24 at one end of the section 19 and a washer 25 mounted on a shoulder intermediate of the ends of the section serve to journal the drive part 12, 13 for rotation on the driven part 19, 21. Section 19 has internal gear teeth 26 while section 21 has face clutch teeth 27.

For holding the drive and driven shafts against relative rotation there is a locking part 28 which is mounted for rotation and axial motion on the shaft 10. Part 28 has face clutch teeth 29 for interengagement with clutch teeth 17 of the drive part, and face clutch teeth 31 for interengagement with clutch teeth 27 of the driven part. The locking part is clamped to the drive and driven parts by means of a split nut 32 that is screw threaded onto the end of shaft 10, the nut itself being adapted to be secured to the shaft by operation of a clamp screw 33. When the nut is unscrewed a compression spring 34 urges the locking part 28 away from the drive and driven parts, thereby disengaging both pairs of face clutch teeth.

Secured to the locking part by screws 35 is a ring 36 formed with a pocket 37 in which is disposed a pinion 38 that mates with both the drive and driven internal gears 16 and 26. As shown in Fig. 1 the ends of the pinion comprise journals which are received in bearings formed in the ring 36 and the part 28. Axial movement of the part 28, in a direction to disengage the clutch teeth, is limited by abutment of a ring 39 wtih an annular ridge 40 that is formed on section 21 of the driven part. The ring 39 is secured to ring 36 by screws 41. Its function is to prevent accidental displacement of the pinion from mesh with the gear teeth 16 and 26. Such displacement can be effected only after removal of screws 18 and separation of sections 12 and 13.

In the particular example illustrated the internal gears 16 and 26, while of the same diameter and mating with the same pinion (an 18 tooth pinion), have different numbers of teeth, these numbers being 100 and 102 respectively. The related pairs of clutch teeth have corresponding tooth numbers. That is the interengaging series of clutch teeth 17 and 29 each comprise 100 teeth, and the interengaging series of clutch teeth 27 and 31 each comprise 102 teeth. By this arrangement, or any other tooth number arrangement embodying the same principle, the gearing 16, 38, 26 compels such an angular relationship of the drive and driven and locking parts that in any position of the locking part in which its clutch teeth 29 will interengage with their mating teeth 17, its clutch teeth 31 will also interengage with their mating teeth 27. It is not necessary to this result that the tooth numbers of the face clutch elements be the same as the tooth numbers of the respective gears, nor that the pinion have the same system of teeth or even the same number of teeth for mesh with both gears, although this is preferred since it permits greater axial motion of the pinion relative to the gears. All that is essential is that the tooth number ratio of one pair of clutch teeth to the other pair of clutch teeth be the same as (or an integral multiple, or the reciprocal of such integral multiple, of) the ratio which the tooth number ratio of gear 16 to pinion 38 bears to the tooth number ratio of gear 26 to pinion 38.

As will be evident, it is necessary in the manufacture of the parts that the teeth 16 and 17, the teeth 29 and 31, and the teeth 26 and 27, be properly related so that both pairs of clutch teeth will be interengageable when the gears have been assembled with the pinion. This relationship is conveniently accomplished by drilling the holes for the dowels or screws which join sections 19 and 21 while these sections are in assembled relation with section 13, pinion 38 and part 28.

In adjusting the device the screw 33 is loosened and the nut 32 unscrewed along shaft 10 sufficiently far to allow complete disengagement of both pairs of clutch teeth, such disengagement being effected by spring 34. The pinion is long enough so that throughout this motion of the locking part 28, and the return motion when the clutch teeth are re-engaged, it remains in mesh with both gears 16 and 26. While the clutch teeth are disengaged the part 28 is rotated through the desired angle. If for example it is advanced by one tooth (of clutch pair 17, 29) or $\frac{1}{100}$ of a revolution the result will be that through the action of the gearing 16, 38, 26 the driven part 19, 21 will be rotated $\frac{1}{100}-\frac{1}{102}$ or $\frac{1}{5100}$, of a revolution in the same direction. Or, if the part 28 is turned through a complete revolution the driven part will be advanced by $\frac{1}{51}$ of a turn. Whatever integral number of teeth (17, 29) the part 28 is advanced, upon retightening the nut 32 on shaft 10 both pairs of clutch teeth will properly interengage. The device is preferably so arranged that the outer ends of clutch teeth 17, 29 are visible to the operator, so that he may properly align them before retightening nut 32. However if they are slightly misaligned they will be brought into proper alignment by and upon rotation of the nut, by reason of cam action of the interengaging clutch teeth. This cam action results from the inclination of the side faces of the teeth which is clearly shown in Figs. 3 and 4. If desired, suitable graduations may be applied to the adjacent exterior surfaces of part 12, 13 and part 28 to aid the operator in making the adjustment.

It will be understood that in order to obtain maximum fineness of adjustment while using clutch and gear teeth of a given pitch, it is desirable that the tooth numbers of the gears be only slightly different. For this reason the relative rolling motion of the pinion should be in the same direction with respect to both gears. That is, either both gears should be internal or both should be external. As before indicated, internal gears are preferred because for a given overall diameter of the device and a given circular pitch of the gears and clutch teeth, greater tooth numbers and hence greater fineness of adjustment are possible with them.

In the illustrated embodiment, where each set of teeth 16, 26, 17 and 27, etc. is arranged in a continuous circle, the number of teeth is, of course, the reciprocal of the pitch of the teeth. Pitch of course refers to the distance from a point on one tooth to a corresponding point on an adjacent tooth, and, as applied to the particular embodiment of the invention shown in the drawings, where the relative motions of the parts are angular as distinguished from linear, the angular pitch as distinguished from linear pitch must be considered. Thus the pitch of teeth 16 and 17 may be considered to be $\frac{1}{100}$ of 360° and the pitch of teeth 26 and 27 to be 1/102 of 360°. It will be apparent that in the event the teeth are not arranged in continuous circles, as for example if the gear teeth 16 and 26 extend only part way around the members 13 and 19, then the relative pitch of these teeth will determine the relative motion of the members 13 and 19 for a given rotation of pinion 38, and the actual number of teeth becomes inconsequential so far as such relative motion is concerned. Similarly the angular pitch of circularly arranged clutch teeth 17, 29 and 27, 31 is determinative rather than the actual members of teeth, if some of the teeth are omitted. Viewed in another way, it may be said at least where the teeth are circularly arranged, that the number of teeth to be considered is the number of teeth which would complete the circle rather than the actual number.

It will be understood further that the foregoing disclosure is made by way of example, to illustrate and explain the inventive principles involved, and not by way of limitation; and that these principles may be embodied in other physical forms without departing from the spirit of the invention or the scope of the appended claims.

I claim:

1. In a device of the class described, coaxial drive and driven and locking parts, the locking part having clutch teeth mating with teeth on the drive and driven members, the tooth numbers of the two pairs of clutch teeth being different, and gearing, including a member mounted rotatably on the locking part, for compelling such angular relationship of the parts that in positions wherein one pair of clutch teeth will interengage the other pair will also interengage.

2. In a device of the class described, coaxial drive and driven and locking parts, the locking part having clutch teeth engageable with mating teeth on the drive and driven members, the drive and driven parts each including a gear, and a pinion mounted rotatably on the locking part and meshing with both gears, the arrangement being such that the relative rolling motion of the pinion is in the same direction with respect to both gears.

3. In a device according to claim 2, the locking part being movable axially to and from clutch tooth engagement with the drive and driven parts, and the pinion remaining in mesh with the gears throughout such movement.

4. In a device according to claim 2, the pinion being cylindrical and of a single tooth number and the two gears being of different tooth numbers.

5. In a device according to claim 2, the two mating pairs of clutch teeth being of different tooth numbers, and the gears having different tooth number ratios to the pinion.

6. In a device according to claim 4, the pinion being movable axially with the locking part, the latter being movable axially to and from clutch tooth engagement with the drive and driven parts, and the pinion remaining in mesh with the gears throughout such movement.

7. In a device according to claim 5, the ratio of the tooth numbers of the two mating pairs of clutch teeth being the same as the ratio of the tooth number ratios of the gears to the pinion.

8. In a device of the class described, coaxial drive and driven and locking parts, the locking part having face clutch teeth of one tooth number engageable with mating face clutch teeth on the drive part and having face clutch teeth of different tooth number engageable with mating face clutch teeth on the driven part, the locking part being movable axially to simultaneously engage or disengage both pairs of clutch teeth, the drive and driven parts each including an internal gear, the gears having the same tooth number ratio as the two pairs of clutch teeth, and a pinion rotatable on the locking part and movable axially therewith, the pinion being of a single tooth number and meshing with both gears throughout such axial movement.

9. In a device of the class described, a shaft and a part rotatable thereon which has face clutch teeth and internal gear teeth of the same tooth number, a member having internal gear teeth, an element having face clutch teeth, said member and said element both being secured to the shaft and being of the same tooth number which is different from that of said part, a locking member rotatable and axially movable on the shaft, said locking member having clutch teeth for simultaneously engaging the clutch teeth of said part and of the first mentioned member, and a pinion of single tooth number rotatable on the locking member and movable axially therewith, the pinion meshing with both sets of internal gear teeth throughout such axial movement.

10. In a device according to claim 9, means for limiting the axial movement of the locking member on the shaft, for preventing accidental displacement of the pinion from mesh with said internal gear teeth.

11. In a device for making fine adjustments, two parts to be adjusted, one relative to the other, and a locking part movable relative to them, the locking part having clutch teeth mating with teeth respectively on said two parts, the pitches of the two pairs of mating teeth being different, and gearing connecting all three of the parts for compelling such relative movements of them that in positions wherein one pair of said mating teeth will interengage the other pair will also interengage.

12. A device according to claim 11 in which one of said two parts is rotatable relative to the other, and the locking part is rotatable relative to them about their axis of relative rotation.

13. A device according to claim 11 in which said gearing comprises a pinion carried by and rotatable upon the locking part and meshing with teeth respectively on said two parts.

14. A device according to claim 12 in which said gearing comprises a pinion rotatable on the locking part and meshing with gear teeth respectively on said two parts.

ARTHUR L. STEWART.

No references cited.